United States Patent
Mukouyama et al.

[11] Patent Number: 6,067,176
[45] Date of Patent: May 23, 2000

[54] REFLECTIVE PROJECTION-TYPE DISPLAYING APPARATUS

[75] Inventors: Tatsuya Mukouyama; Tetsuji Suzuki, both of Yokosuka, Japan

[73] Assignee: Victor Company of Japan, Ltd., Yokohama, Japan

[21] Appl. No.: 09/197,153

[22] Filed: Nov. 20, 1998

[30] Foreign Application Priority Data

Nov. 22, 1997 [JP] Japan .................................. 9-337933

[51] Int. Cl.$^7$ .................................................. G02B 5/32
[52] U.S. Cl. .............................. 359/15; 359/34; 349/62; 349/106
[58] Field of Search ................................ 359/15, 20, 19, 359/34, 35; 349/62, 65, 95, 106

[56] References Cited

U.S. PATENT DOCUMENTS 5,737,040 4/1998 Ichikawa et al. ......................... 359/15

FOREIGN PATENT DOCUMENTS 2-500937 3/1990 Japan .
9-189809 7/1997 Japan .

*Primary Examiner*—Darren E. Schuberg
*Attorney, Agent, or Firm*—Eugene Lieberstein; Michael N. Meller

[57] ABSTRACT

A projection-type displaying apparatus is disclosed. The apparatus has a coupling prism, a glass substrate joined to the coupling prism and a liquid crystal display panel containing pixel electrodes. A refractive index of the coupling prism is greater than a refractive index of the glass substrate. The apparatus also has a transmission-type holographic color filter provided between the glass substrate and liquid crystal display panel. Light beams enter the apparatus through the plane of incidence of the coupling prism and go through the glass substrate. The light beams are then focused onto the pixel electrodes by the holographic color filter. The focused light beams are modulated by the pixel electrodes and exit the apparatus as projection light beams.

8 Claims, 2 Drawing Sheets

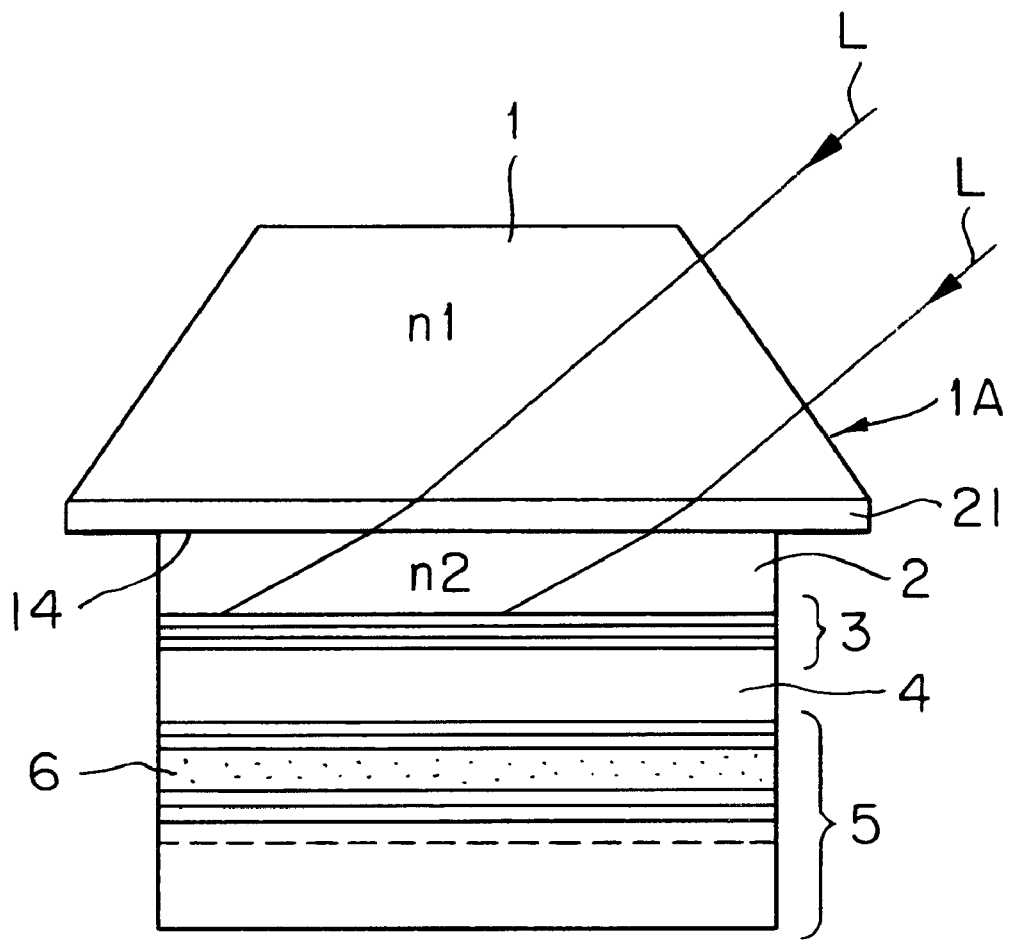
F I G. 3

REFLECTIVE PROJECTION-TYPE DISPLAYING APPARATUS

BACKGROUND OF THE INVENTION

This invention relates to reflective projection-type displaying apparatuses.

Reflective projection-type displaying apparatuses have been used for displaying pictures on a wide screen. The apparatuses are provided with a liquid crystal display (LCD) panel. Light beams enter the panel where the beams are modulated per pixel in accordance with video signals and are projected onto a screen to display pictures.

Displaying apparatuses provided with a reflection-type LCD apanel are generally useful than those with a transmission-type LCD panel. Because the reflection-type LCD panel does not require a black stripe on the liquid crystal layer and hence exhibits large vignetting factor on each liquid crystal cell. Furthermore, the reflection-type LCD panel generates less heat that would be produced to absorption of light beams, thus producing light beams of large emission output to display blight pictures on a screen.

Japanese unexamined Patent publication No. 1997(9)-189809 discloses a displaying apparatus provided with a reflection-type LCD panel. The apparatus is further provided with a holographic color filter that exhibits the maximum optical efficiency when light beams enter the filter at an incident angle of about 60 degrees while the beams having been almost perpendicularly entered the plane of incidence of the apparatus.

The larger the plane of incidence, the higher the illumination efficiency. This apparatus however cannot provide the plane of incidence large enough for achieving high illumination efficiency due to its optical construction.

SUMMARY OF THE INVENTION

An object of the present invention provides a reflective projection-type displaying apparatus that achieves high illumination efficiency.

The present invention provides a projection-type displaying apparatus. The apparatus includes a coupling prism having a plane of incidence through which light beams enter the apparatus, a glass substrate joined to the coupling prism and a liquid crystal display panel containing pixel electrodes. A refractive index of the coupling prism is greater than a refractive index of the glass substrate. The apparatus further includes a transmission-type holographic color filter provided between the glass substrate and the liquid crystal display panel. The color filter focuses the light beams that go through the glass substrate onto the pixel electrodes. The light beams are modulated by the pixel electrodes and exit the apparatus as projection light beams.

The difference in refractive index such that the refractive index of the coupling prism is greater than the refractive index of the glass substrate provides a preferable area for the plane of incidence of the coupling prism through which light beams enter the apparatus. The difference further provides a preferable angle of incidence of the light beams to the transmission-type holographic color filter. The present invention thus achieves high illumination efficiency for the projection-type displaying apparatus.

BRIEF DESCRIPTION OF DRAWINGS

FIG. 3 illustrates a sectional view of the third preferred embodiment of the reflective projection-type displaying apparatus according to the present invention.

DETAILED DESCRIPTION OF PREFERRED EMBODIMENTS

Preferred embodiments of the reflective projection-type displaying apparatus according to the present invention will be described with reference to the attached drawings.

Figure 1:
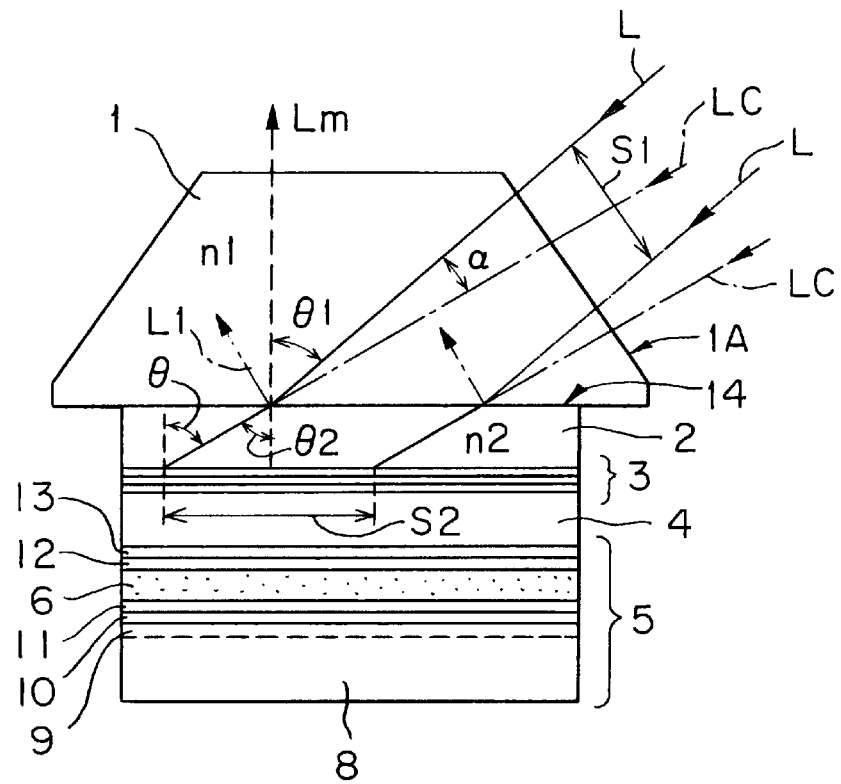
FIG. 1 illustrates a sectional view of the first preferred embodiment of the reflective projection-type displaying apparatus according to the present invention.

The first embodiment of the reflective projection-type displaying apparatus shown in FIG. 1 is provided with a coupling prism 1 having trapezoid shape in section. Attached to the bottom of the coupling prism 1 are a glass plate 2, a transmission-type holographic color filter 3, a thin glass layer 4 and an LCD panel 5 laminated in order.

The LCD panel 5 is constructed by laminating a substrate 8 made of glass or silicon, an active matrix driver 9, a pixel electrode layer 10, an orientation film 11, a liquid crystal 6 sealed by spacers (not shown), an orientation film 12 and a transparent common electrode film 13. The pixel electrode layer 10 contains many electrodes arranged in matrix and selectively controlled by the active matrix driver 9.

A transmission-type holographic color filter disclosed in Japanese unexamined Patent Publication No. 1990(2)-500937 can be employed as the color filter 3 shown in FIG. 1. The color filter has a hologram made of a holographic lens array.

The holographic color filter 3 diffracts and disperses incident light beams crying primaries R, G and B. The color filter 3 further acts as a lens to almost perpendicularly focus the diffracted and dispersed light beams onto pixel electrodes of the LCD panel corresponding to the primaries R, G and B.

The coupling prism 1 and the glass plate 2 that is directly joined thereto are formed such that a refractive index n1 of the former is greater than a refractive index n2 of the latter. The refractive index n1 of the coupling prism 1 is preferably in the range of approximately 1.60 to 1.80. This arrangement causes light beams L to horizontally refract at a joining portion 14 of the coupling prism 1 and the glass plate 2. To make the light beams L enter the color filter 3 at an incident angle θ of about 60 degrees, the light beams L are forced to enter the coupling prism 1 through a plane of incidence 1A at an incident angle of about 90 degrees and another incident angle to the joining portion 14, which is greater by an angle a than a conventional incident angle of imaginary reading light beams Lc. The coupling prism 1 is formed with the inclined plane of incidence 1A so that the light beams L enter the coupling prism 1 through the plane of incidence 1A at the incident angle of about 90 degrees. The imaginary light beams Lc are shown in FIG. 1 for comparison between the present invention and the conventional apparatus, illustrating difference in incident angle therebetween.

In operation, the light beams L emitted from a white light source (not shown) perpendicularly enter the coupling prism 1 through the plane of incidence 1A. The light beams L go through the coupling prism 1 and glass plate 2, and then enter the holographic color filter 3 at the incident angle θ of about 60 degrees. The light beams L are diffracted and dispersed by the color filter 3 and enter the LCD panel 6 through the thin glass layer 4. The light beams L are then polarized and modulated by the liquid crystal 6 and reflected to the coupling prism 1. The reflected beams exit the coupling prism 1 as modulated light beams Lm. The modulated light beams are then projected by a projection lens onto a wide screen (both not shown).

As described above, the coupling prism 1 and glass plate 2 are formed such that the refractive index n1 of the former is greater than the refractive index n2 of the latter. The reading light beams L are thus horizontally refracted at the joining portion 14 according to the Snell's law, thus a refractive angle θ2 is greater than an incident angle θ1.

To meet the requirement that incident angle θ of the reading light beams L is about 60 degrees, the apparatus is adjusted such that the light beams L enter the coupling prism 1 through the plane of incidence 1A in the incident direction upper by the angle α than that for the conventional apparatus.

An area S1 on the plane of incidence 1A is illuminated by the light beams L, and then an area S2 on the color filter 3 is illuminated by the reflected light beams. The area S1 on the plane of incidence 1A is larger than a corresponding area on the plane of incidence of the conventional apparatus due to the angle α and which is achieved by the relationship between the refractive indexes n1 and n2 described above.

The large area S1 on the plane of incidence improves illumination efficiency. The present invention thus achieves a reflective projection-type displaying apparatus that can display pictures on a screen with high luminance.

Next, the second embodiment of the reflective projection-type displaying apparatus according to the present invention will be described with reference to FIG. 2. Elements in this embodiment that are the same or analogous to elements in the first embodiment are referenced by the same reference numerals and will not be explained in detail.

Figure 2:
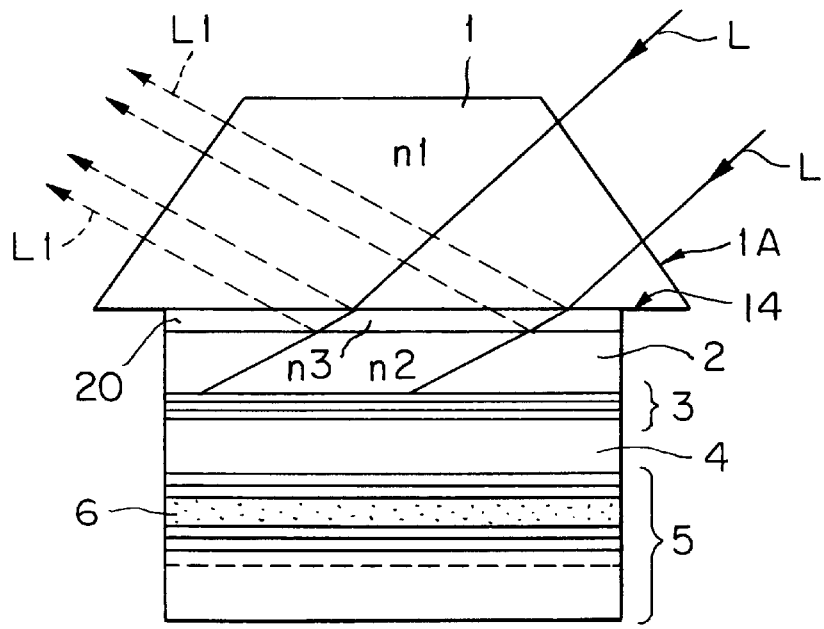
FIG. 2 illustrates a sectional view of the second preferred embodiment of the reflective projection-type displaying apparatus according to the present invention.

The apparatus shown in FIG. 2 is provided with a matching oil 20, such as a silicon oil, that is sealed between the coupling prism 1 and glass substrate 2. A matching oil is a liquid a refractive index of which is adjusted to a desired valve. The matching oil 20 exhibits a refractive index n3 that is smaller than the refractive index n1 of the coupling prism 1 but greater than the refractive index n2 of the glass substrate 2. The refractive index n3 is preferably the intermediate value of the refractive indexes n1 and n2.

The matching oil 20 acts as a means for lowering reflectivity at the joining portion 14 of the coupling prism 1 and glass substrate 2 exhibiting different refractive indexes as described above. The matching oil 20 prevents light beams L1 from being reflected at the joining portion 14. As the means for lowering reflectivity, a glue, such as, an ultraviolet curing-type glue, can be used instead of the matching oil. The bigger the difference in refractive index between the coupling prism 1 and glass substrate 2, the bigger the amount of the reflected light beams L1. This means that, preferably, for lowering reflectivity at the joining portion 14, the coupling prism 1 and glass substrate 2 are formed such that the refractive indexes n1 and n2 are equal to each other.

Next, the third embodiment of the reflective projection-type displaying apparatus according to the present invention will be described with reference to FIG. 3. Elements in this embodiment that are the same or analogous to elements in the first embodiment are also referenced by the same reference numerals and will not be explained in detail.

The apparatus shown in FIG. 3 is provided with a reflection preventing film 21 between the coupling prism 1 and glass substrate 2. In detail, the coupling prism 1 or the glass substrate 2 is coated with the reflection preventing film 21. The reflection preventing film 21 may be formed of $SiO_2$, $TiO_2$, $Al_2O_3$, or the like. The reflection preventing film 21 also prevents light reflection at the joining portion 14 to achieve high contrast of pictures displayed on a screen.

In FIGS. 2 and 3, the matching 20 and the reflection preventing film 21, respectively, are illustrated as fairly thick for better understanding of the construction of the apparatuses. However, they are actually very thin compared to the other elements, such as, the reflection preventing film 21.

Furthermore, the incident angle of the light beams at the color filter 3 is about 60 degrees in the embodiments, however, is not limited to this.

What is claimed is:

1. A projection-type displaying apparatus comprising:

a coupling prism having a plane of incidence through which light beams enter the apparatus;

a glass substrate joined to the coupling prism, a first refractive index of the coupling prism being greater than a second refractive index of the glass substrate;

a glass layer;

a liquid crystal display panel joined to the glass layer and containing pixel electrodes; and a transmission-type holographic color filter provided between the glass substrate and the glass layer, the color filter focusing the light beams that go through the glass substrate onto the pixel electrodes, the light beams being modulated by the pixel electrodes and exiting the apparatus as projection light beams.

2. The apparatus according to claim 1 further comprising means for lowering reflectivity of the light beams at a joining portion of the coupling prism and the glass substrate.

3. The apparatus according to claim 2, wherein a third refractive index of the reflectivity lowering means is smaller than the first refractive index but greater than the second refractive index.

4. The apparatus according to claim 2, wherein the reflectivity lowering means includes a matching oil.

5. The apparatus according to claim 4, wherein the matching oil is a silicon oil.

6. The apparatus according to claim 2, wherein the reflectivity lowering means includes an ultraviolet curing-type glue.

7. The apparatus according to claim 1 further comprising a reflection preventing film between the coupling prism and the glass substrate.

8. The apparatus according to claim 7, wherein the reflection preventing film includes $SiO_2$, $TiO_2$ or $Al_2O_3$.

* * * * *